United States Patent Office 2,971,985
Patented Feb. 14, 1961

1

2,971,985
PROCESS FOR THE PREPARATION OF 4,4'-DICHLORODIPHENYLSULFONE

Robert Joly, Montmorency, Robert Bucourt, Villiers-le-Bel, and Colette Fabignon, Paris, France, assignors to UCLAF, Paris, France, a corporation of France No Drawing. Filed Apr. 16, 1959, Ser. No. 806,767

Claims priority, application France July 5, 1958

4 Claims. (Cl. 260—607)

The object of the present invention is an improved commercial process for the preparation of 4,4'-dichlorodiphenylsulfone, an intermediate product which undergoes amination to form 4,4'-diaminodiphenylsulfone. 4,4'-diaminodiphenylsulfone is, at present, the preferred medicine in the treatment of leprosy, and in addition, it has found important industrial applications in the hardening of epoxy resins.

The process of obtaining 4,4'-dichlorodiphenylsulfone heretofore used was by the condensation of p-chlorobenzene-sulfochloride with chlorobenzene in the presence of aluminum chloride. This process requires, in addition to an apparatus particularly resistant to corrosion, the preliminary preparation of p-chlorobenzene-sulfochloride and its isolation. The direct conversion of chlorobenzene into 4,4'-dichlorodiphenylsulfone by means of chlorosulfonic acid or sulfuric anhydride is also known but this process gives yields of only about 30%.

We have found that 4,4'-dichlorodiphenylsulfone in yields of about 90% of the theoretical can be obtained by a direct reaction starting with chlorobenzene according to the process of our invention. Stabilized sulfuric anhydride in the usual commercial form, as sold under the trade name "Sulfan" is reacted with dimethylsulfate in a ratio of two mols of "Sulfan" to one mol of dimethylsulfate, to give a solution containing one mol of sulfuric anhydride and one mol of dimethylpyrosulfate, $$CH_3O—SO_2—O—SO_2—OCH_3$$

To this solution is added 2 mols of chlorobenzene and the desired 4,4'-dichlorodiphenylsulfone is isolated by simple precipitation with water. The solution of sulfuric anhydride in dimethylpyrosulfate may also be obtained by reaction of 1 mol of dimethyloxide, $CH_3—O—CH_3$, with 3 mols of "Sulfan."

This reaction can be carried out on an industrial scale in ordinary apparatus and does not require isolation or separation of intermediate products or of secondary by-products. This reaction occurs below 100° C. and there is no particular heating or cooling problem. Operation in the presence of a solvent and a solvent recovery system is also avoided.

The overall reaction can be written as follows:

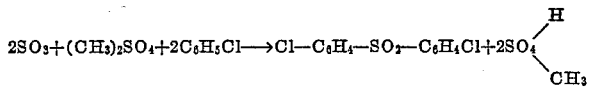

The following example illustrates the invention without, however, limiting it. For example, the order of introduction of the reagents may be reversed or the methylpyrosulfate may be prepared first, then 1 mol of sulfuric anhydride be dissolved in it, the methylpyrosulfate mixed with the chlorobenzene and finally the sulfuric anhydride added, the additions fractionated, the reaction temperatures varied, or another dialkylsulfate used, without thereby deviating from the scope of the invention.

EXAMPLE

*Preparation of p,p'-dichlorodiphenylsulfone*

80 gm. (1 mol) of stabilized sulfuric anhydride ("Sulfan") which is supercooled to 25° C. are introduced over a period of 20 minutes into 126 gm. (1 mol) of dimethylsulfate under agitation while excluding moisture present in air and maintaining a temperature of 70–75° C. Agitation of the clear solution is continued slowly for 30 minutes while maintaining the temperature at 70–75° C. Thereafter, the solution is cooled to 20° C., and 80 gm. (1 mol) of stabilized sulfuric anhydride ("Sulfan") are added. During the addition, the temperature rises from 20° C. to 30° C. The liquid mixture thus obtained is transferred to a bromine funnel and is introduced, over a period of about 20 minutes, into 225 gm. (2 mols) of chlorobenzene which is maintained at a temperature of 50–55° C. During the introduction, the temperature of the reaction mixture is maintained at 50° C. by a slight cooling. When the exothermic reaction ceases, the temperature is maintained at 50° C. by heating while agitating the reaction mixture for another hour. Then the reaction mixture, in which a portion of the sulfone has already crystallized, is passed into 600 cc. of water. The sulfone precipitates while still hot, and is filtered and washed with hot water until the pH of the wash water reaches 5. After drying, 258 gm. of 4,4'-dichlorodiphenylsulfone are obtained, a yield of 90% of the theoretical. This sulfone can be utilized directly for the preparation of 4,4'-diaminodiphenylsulfone without further purification.

It is readily apparent to those skilled in the art that various modifications and substitutions can be made in the above example without departing from the spirit of the invention or the scope of the appended claims.

We claim:

1. A process for the preparation of 4,4'-dichlorodiphenylsulfone which comprises reacting an equimolar mixture of dimethylpyrosulfate and sulfur trioxide with chlorobenzene at temperatures below 100° C. and recovering 4,4-dichlorodiphenylsulfone.

2. The process of claim 1 wherein equimolar amounts of dimethylpyrosulfate and sulfur trioxide are reacted with chlorobenzene in a ratio of two mols of chlorobenzene for every mol of sulfur trioxide.

3. The process of claim 1 wherein said mixture of dimethylpyrosulfate and sulfur trioxide is formed in situ by the reaction of sulfur trioxide on a compound selected from the group consisting of dimethyloxide and dimethylsulfate.

4. A process for the production of 4,4'-dichlorodiphenylsulfone which comprises reacting a solution of about one mol of stabilized liquid sulfur trioxide and about one mol of dimethylpyrosulfate with about two mols of chlorobenzene at a temperature between about 50° C. and about 55° C., adding water to precipitate 4,4'-dichlorodiphenylsulfone and recovering said precipitated sulfone.

References Cited in the file of this patent

UNITED STATES PATENTS 2,000,061   Carr _____ May 7, 1935